Patented June 12, 1945

2,378,030

UNITED STATES PATENT OFFICE 2,378,030

MANUFACTURE OF SYNTHETIC ELASTOMERS

John F. Olin, Grosse Ile, Mich., assignor to Sharples Chemicals Inc., Philadelphia, Pa., a corporation of Delaware No Drawing. Application February 19, 1943, Serial No. 476,497

13 Claims. (Cl. 260—84.5)

The present invention pertains to the manufacture of synthetic elastomers from conjugated diolefins, such as butadiene-1,3, isoprene and other homologues of butadiene-1,3, which are capable of being polymerized to form such elastomers. In the manufacture of such elastomers, the conjugated diolefins may be polymerized either alone or together with other unsaturated compounds. Such other unsaturated compounds may include acrylonitrile, methacrylonitrile, acrylic acid esters, vinyl methyl ketone or other compounds having a vinyl linkage in conjugation with a C=O or C≡N grouping, or styrene, or vinylidene chloride.

The preferred method of accomplishing such polymerization is the so-called emulsion polymerization method, in which an aqueous emulsion containing the unsaturated compounds is formed with the aid of emulsifying agents such as soaps, sodium alkyl sulphates or salts of alkyl naphthalene sulphonic acids. The polymerization is effected by the catalytic activity of a catalyst introduced into the emulsified mass, such catalyst being usually one capable of liberating hydrogen peroxide in small amounts. Among catalysts which have been used for this purpose are ammonium persulphate, potassium persulphate, benzoyl peroxide, sodium perborate, and hydrogen peroxide itself. These catalysts are capable of effecting the desired polymerization at relatively low temperatures, co-polymerization between butadiene 1,3 and acrylonitrile, for example, being accomplished at temperatures between 20 and 55° C.

A particular advantage of the emulsion polymerization method as compared to the so-called mass polymerization method consists in the fact that the emulsion method yields products which are in most cases more closely similar to natural rubber than those obtained when polymerization is effected by the mass polymerization method. On the other hand, certain difficulties are encountered in the practice of the emulsion polymerization process unless special precautions are taken. Unless the conditions of polymerization are carefully controlled, the resulting polymerization products lack the plasticity which is desirable for such processing operations as milling, calendering and extruding which are performed prior to vulcanization. According to the patent to Wollthan, 2,281,613, the desired control of polymerization is provided, and polymers having the desired degree of plasticity are obtained, by incorporating in the aqueous emulsion employed in the polymerization reaction a mercaptan having at least six carbon atoms in an aliphatic linkage.

The present invention constitutes an improvement over that of the Wollthan patent in that it involves incorporation in the emulsion polymerization reaction mixture of a new class of aliphatic mercaptans. These new mercaptans, containing between 8 and 16 carbon atoms inclusive, may be made by the process of my co-pending application Serial No. 459,025, filed September 19, 1942, for higher mercaptans and manufacture thereof. As taught in that application, the preferred method of producing these secondary and tertiary alkyl mercaptans containing between 8 and 16 carbon atoms in the alkyl radical is accomplished by reacting an olefin of the desired carbon content with hydrogen sulphide in the presence of an activated clay containing a small amount of a mineral acid, preferably sulphuric acid, at temperatures between 100° and 150° C. The preferred compounds for use in practice of the invention are the tertiary alkyl mercaptans formed by condensing iso-olefins with hydrogen sulphide.

By using the tertiary alkyl mercaptans of the present invention as polymerization controllers in the emulsion polymerization process as practiced in manufacture of synthetic elastomers from conjugated diolefins, it is possible to effect an adequate control of the polymerization reaction by the use of much smaller quantities of the mercaptan than have been found necessary in the practice of prior emulsion polymerization processes. Not only does the practice of the invention result in a saving in the quantity of mercapto material necessary to effect the required control, but it also provides an excellent yield of a polymerized material of outstanding processing properties. A further advantage results from the fact that these new tertiary mercaptans may, by practice of the process of my prior application referred to above, be produced much more cheaply than can the corresponding primary mercaptans of the Wollthan patent.

A preferred material for control of polymerization in the practice of the invention may be obtained by sulphydration of polymerized olefins containing between 8 and 16 carbon atoms inclusive, mercaptans formed from tertiary olefins containing between 10 and 13 carbon atoms inclusive being especially preferred. Tertiary dodecyl mercaptan formed by condensation of tri-isobutylene with hydrogen sulphide, for example, forms an excellent polymerization controller in the practice of the invention.

The tertiary mercaptans employed for control of polymerization in the practice of the present invention may be used as the sole controlling agent for polymerization, or they may be used in conjunction with varying amounts of other controlling agents. For example, they may be used together with the primary normal alkyl mercaptans proposed in Wollthan Patent 2,281,613, and when so used, the total quantity of mercapto material necessary to effect the desired control is substantially less than would be required if the mercaptans of the Wollthan patent alone were to be used to control such polymerization.

While the invention involves as a preferred form the control of polymerization through the use of a tertiary mercaptan containing from 8 to 16 carbon atoms, it also includes the use of those secondary mercaptans of similar carbon content prepared by the addition of hydrogen sulphide to the corresponding olefins. Such secondary mercaptans, obtained by the process of my co-pending application Serial No. 459,025, as those from n-octenes, n-dodecenes, indene, styrene and anethole are of particular value. It also encompasses the use of dimercaptans of suitable carbon content obtained from diolefins such as dicyclopentadiene. It has been found that in the case of certain diolefins such as dipentene, where one double bond is more active than the other, that hydrogen sulphide yields a monomercaptan rather than the expected dimercaptan. The product from dipentene, like its isomer from pinene, possesses good directive influence on the emulsion polymerization of diolefins.

While the invention may be practiced by control of polymerization using these mercaptans in co-polymerization with conjugated diolefins of any of the various compounds having a C=C linkage which are capable of undergoing such co-polymerization to form synthetic elastomers, it is especially useful in co-polymerization of styrene or acrylonitrile with conjugated diolefins. When acrylonitrile and a conjugated diolefin such as butadiene 1,3 are co-polymerized under control of the tertiary mercaptans, a product of unusually good milling properties is obtained, which is almost as soft as that ordinarily obtained by co-polymerization of butadiene and styrene.

*Example I*

Butadiene and styrene were co-polymerized by the emulsion polymerization method, using the following ingredients in the following proportions in a ten pound batch:

| | Parts by weight |
|---|---|
| Butadiene | 75 |
| Styrene | 25 |
| Tertiary dodecyl mercaptan formed by condensation of tri-isobutylene with hydrogen sulphide | 0.3 |
| Potassium persulphate | 0.3 |
| Soap flakes | 5.0 |
| Water | 180 |

The polymerization of the above mixture was effected by heating with good agitation at a temperature of 125° F. for 14.5 hours. The butadiene-styrene co-polymer was isolated from the resulting aqueous dispersion by the addition of an ionic coagulant comprising a dilute solution of sulphuric acid and sodium chloride. The polymerized product, after washing and drying, proved to be a soft workable type of rubber as indicated by a Mooney plasticity of 53. The incorporation of the usual compounding ingredients as given in the formula below was readily accomplished in the standard milling operation.

| | Parts by weight |
|---|---|
| Polymer | 100 |
| Refined coal tar softener | 5.0 |
| Zinc oxide | 5.0 |
| Soft channel black | 50 |
| Stearic acid | 1.0 |
| Sulphur | 2.0 |
| Mercaptobenzothiazole | 1.5 |

After compounding, the resulting stock was vulcanized by heating at 292° F. for 50 minutes. The vulcanizate had a tensile strength of 3350 pounds per square inch, a modulus at 300% elongation of 895 pounds per square inch, an elongation at break of 670% and a resiliency as measured by the rebound method of 59%.

*Example II*

A 400 pound batch of the same materials in the same proportions as in Example I was mixed and heated at a temperature of 125° F. for 13.5 hours. The polymer was isolated and vulcanized with the usual compounding ingredients as in Example I. The vulcanizate had a tensile strength of 2844 pounds per square inch, a modulus at 300% elongation of 1138 pounds per square inch, an elongation at break of 555% and a resiliency as measured by the rebound method of 56%.

Various modifications are possible within the scope of the invention, and I do not therefore wish to be limited except by the following claims.

I claim:

1. In the manufacture of synthetic elastomers, the process comprising polymerizing a conjugated diolefin hydrocarbon in an aqueous emulsion containing a tertiary alkyl mercaptan having between 8 and 16 carbon atoms.

2. In the manufacture of synthetic elastomers, the process comprising polymerizing a conjugated diolefin hydrocarbon in an aqueous emulsion containing a tertiary alkyl mercaptan having between 10 and 13 carbon atoms.

3. In the manufacture of synthetic elastomers, the process comprising polymerizing a conjugated diolefin hydrocarbon in an aqueous emulsion containing a teritiary alkyl mercaptan having between 8 and 16 carbon atoms resulting from condensation of hydrogen sulphide with a polymerized olefin of the desired carbon content.

4. In the manufacture of synthetic elastomers, the process comprising polymerizing a conjugated diolefin hydrocarbon in an aqueous emulsion containing tertiary dodecyl mercaptan.

5. In the manufacture of synthetic elastomers, the process comprising polymerizing a conjugated diolefin hydrocarbon in an aqueous emulsion containing tertiary dodecyl mercaptan formed by condensing hydrogen sulphide with tri-isobutylene.

6. In the manufacture of synthetic elastomers, the process comprising co-polymerizing a conjugated diolefin hydrocarbon and a second and copolymerizable compound having a single ethylenic C=C linkage in an aqueous emulsion containing a tertiary alkyl mercaptan having between 8 and 16 carbon atoms.

7. In the manufacture of synthetic elastomers, the process comprising co-polymerizing a conjugated diolefin hydrocarbon and acrylonitrile in an aqueous emulsion containing a tertiary alkyl mercaptan having between 8 and 16 carbon atoms.

8. In the manufacture of synthetic elastomers, the process comprising co-polymerizing butadiene-1,3 and acrylonitrile in an aqueous emulsion containing a tertiary alkyl mercaptan having between 8 and 16 carbon atoms.

9. In the manufacture of synthetic elastomers, the process comprising co-polymerizing a conjugated dolefin hydrocarbon and styrene in an aqueous emulsion containing a tertiary alkyl mercaptan having between 8 and 16 carbon atoms.

10. In the manufacture of synthetic elastomers, the process comprising co-polymerizing butadienes-1,3 and styrene in an aqueous emulsion containing a tertiary alkyl mercaptan having between 8 and 16 carbon atoms.

11. In the manufacture of synthetic elastomers, the process comprising polymerizing a conjugated diolefin hydrocarbon in an aqueous emulsion containing a mercaptan having between 8 and 16 carbon atoms resulting from condensation of hydrogen sulphide with an olefin of the desired carbon content.

12. In the manufacture of synthetic elastomers, the process comprising co-polymerizing a conjugated diolefin hydrocarbon and acrylonitrile in an aqueous emulsion containing a mercaptan having between 8 and 16 carbon atoms resulting from condensation of hydrogen sulphide with an olefin of the desired carbon content.

13. In the manufacture of synthetic elastomers, the process comprising co-polymerizing a conjugated diolefin hydrocarbon and styrene in an aqueous emulsion containing a mercaptan having between 8 and 16 carbon atoms resulting from condensation of hydrogen sulphide with an olefin of the desired carbon content.

JOHN F. OLIN.